(12) United States Patent
Veit

(10) Patent No.: US 10,100,616 B2
(45) Date of Patent: Oct. 16, 2018

(54) SPRING CLIPS FOR TUBULAR CONNECTION

(71) Applicant: Halliburton Energy Services, Inc., Houston, TX (US)

(72) Inventor: Jan Veit, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 419 days.

(21) Appl. No.: 14/759,597

(22) PCT Filed: Jan. 31, 2013

(86) PCT No.: PCT/US2013/023973
§ 371 (c)(1),
(2) Date: Jul. 7, 2015

(87) PCT Pub. No.: WO2014/120167
PCT Pub. Date: Aug. 7, 2014

(65) Prior Publication Data
US 2015/0345257 A1    Dec. 3, 2015

(51) Int. Cl.
*E21B 43/08* (2006.01)
*E21B 41/00* (2006.01)
*F16L 21/08* (2006.01)
*E21B 17/02* (2006.01)

(52) U.S. Cl.
CPC ............ *E21B 41/00* (2013.01); *E21B 17/02* (2013.01); *E21B 43/08* (2013.01); *F16L 21/08* (2013.01)

(58) Field of Classification Search
CPC ............... A61M 2039/1066; E21B 43/04; E21B 17/02; E21B 43/045; E21B 43/08; E21B 43/088; E21B 41/00
See application file for complete search history.

(56) References Cited

U.S. PATENT DOCUMENTS

| 763,317 A | * | 6/1904 | Nelson | F16L 37/096 285/148.19 |
| 3,671,921 A | * | 6/1972 | Baker, III | H01R 13/502 439/353 |
| 5,104,253 A | * | 4/1992 | Zielinski | H01R 13/6272 403/329 |
| 5,341,880 A | | 8/1994 | Thorstensen et al. | |
| 5,868,200 A | | 2/1999 | Wade | |

(Continued)

FOREIGN PATENT DOCUMENTS

| WO | 2010028158 A1 | 3/2010 |
| WO | 2013126227 A1 | 8/2013 |
| WO | 2014088594 A1 | 6/2014 |

OTHER PUBLICATIONS

PCT International Preliminary Report on Patentability, PCT/US2013/023973, dated Aug. 13, 2015, 10 pages.

(Continued)

*Primary Examiner* — Kipp C Wallace
(74) *Attorney, Agent, or Firm* — Scott Richardson; Parker Justiss, P.C.

(57) ABSTRACT

A jumper tube is connected to a shunt tube of a well screen assembly by positioning the jumper tube end to end, adjacent with the shunt tube. A spring clip is then flexed over a profile of a coupling and allowed to snap into gripping engagement of the coupling, thereby retaining the jumper tube relative to the first screen assembly.

16 Claims, 5 Drawing Sheets

(56) References Cited

U.S. PATENT DOCUMENTS

| | | | |
|---|---|---|---|
| 6,257,626 B1* | 7/2001 | Campau | F16L 37/0985 |
| | | | 285/319 |
| 6,834,888 B2* | 12/2004 | Campau | F16L 37/138 |
| | | | 285/320 |
| 7,497,267 B2 | 3/2009 | Setterberg, Jr. et al. | |
| 7,886,819 B2 | 2/2011 | Setterberg, Jr. et al. | |
| 9,080,705 B2* | 7/2015 | Nezu | F16L 37/096 |
| 2002/0157836 A1 | 10/2002 | Royer et al. | |
| 2003/0075315 A1 | 4/2003 | Nguyen et al. | |
| 2006/0283604 A1 | 12/2006 | Setterberg, Jr. et al. | |
| 2009/0294128 A1 | 12/2009 | Dale et al. | |
| 2010/0059232 A1* | 3/2010 | Langlais | E21B 17/02 |
| | | | 166/380 |
| 2010/0136501 A1* | 6/2010 | Schuetz | A61C 8/0022 |
| | | | 433/80 |
| 2012/0234532 A1 | 9/2012 | Kuo | |
| 2013/0220606 A1* | 8/2013 | Yhuel | E21B 43/08 |
| | | | 166/278 |

OTHER PUBLICATIONS

PCT International Search Report and Written Opinion of the International Searching Authority, PCT/US2013/023973, dated Oct. 8, 2013, 14 pages.

\* cited by examiner

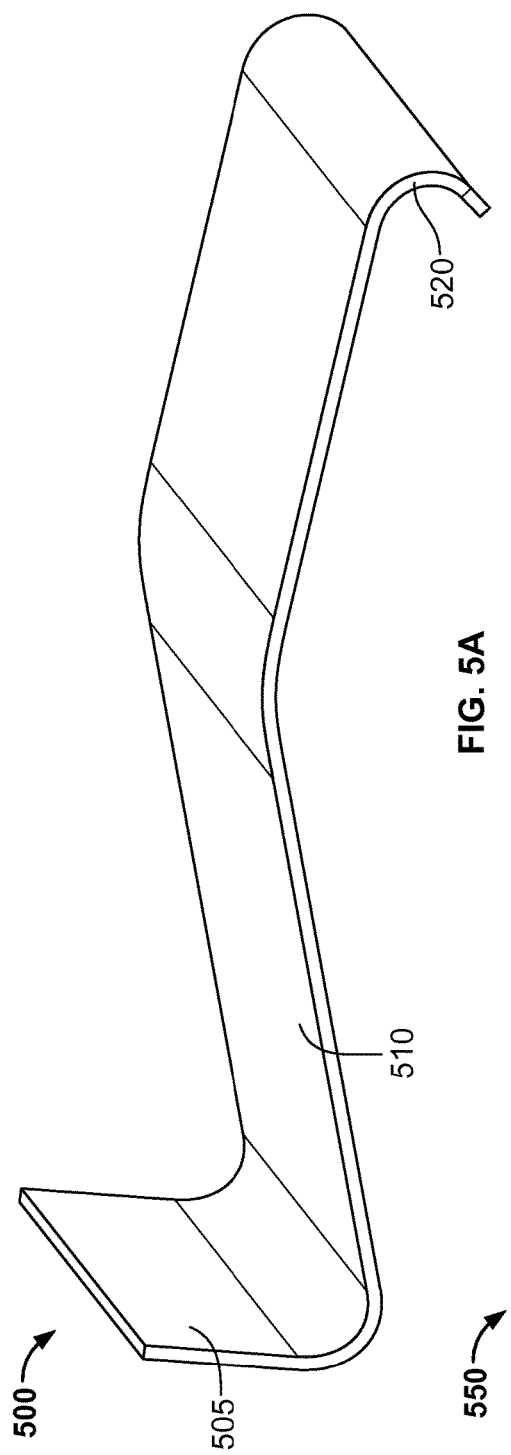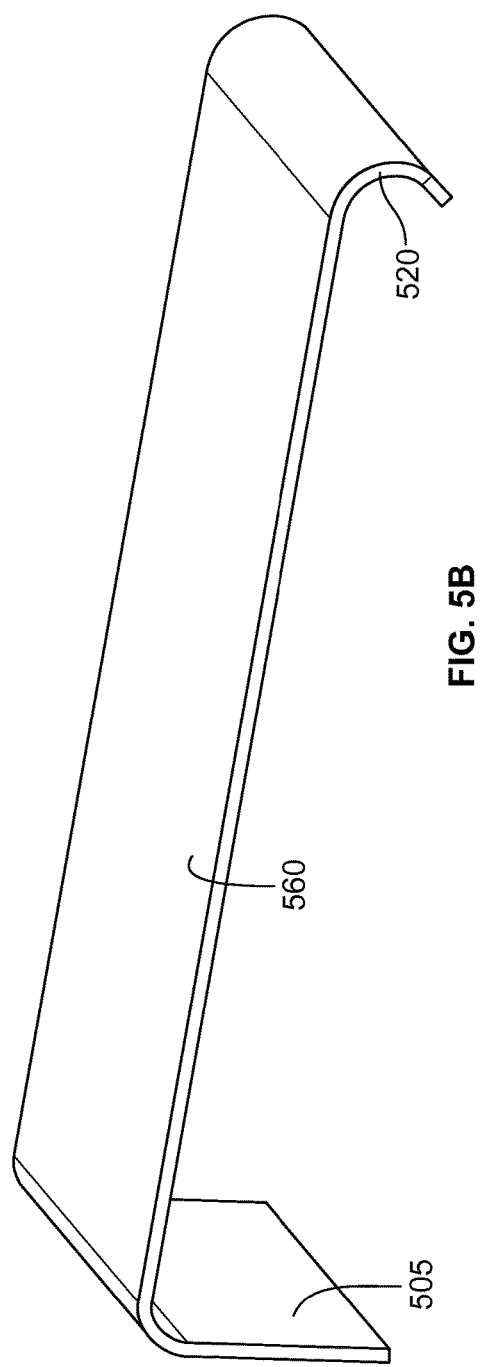

US 10,100,616 B2

SPRING CLIPS FOR TUBULAR CONNECTION

CLAIM OF PRIORITY

This application is a U.S. National Phase Application of and claims the benefit of priority to International Patent Application Serial No. PCT/US2013/023973, filed on Jan. 31, 2013, the entire contents of which are hereby incorporated by reference.

TECHNICAL FIELD

This disclosure relates to coupling jumper tubes of well screen assemblies.

BACKGROUND

Wells often use screen systems in their production string to filter solid particles (e.g., sand) greater than a permitted size. Some wells are gravel packed by placing gravel in the annulus around the well screen system. For example, in an open-hole completion, gravel is typically placed between the wall of the wellbore and the production string. Alternatively, in a cased-hole completion, gravel is placed between a perforated casing string and the production string. In both types of completions, formation fluids flow from the subterranean formation into the production string through the gravel pack and well screen system.

The gravel is carried into the well with a carrier liquid in a slurry. Premature loss of the carrier liquid into the formation can result in an incomplete packing of the production interval and cause sand bridges to form in the annulus. Alternate flow paths through the well screen systems can be used to provide an alternate path around the sand bridges. For example, shunt tubes in the well screen assemblies and jumper tubes between the well screen assemblies can be used to bypass sand bridges.

DESCRIPTION OF DRAWINGS

FIGS. 5A and 5B are perspective views of example spring clips for connecting jumper tubes.

Like reference symbols in the various drawings indicate like elements.

DETAILED DESCRIPTION

In some implementations, in completing an open hole section of a well, a production string having one or more well screen assemblies is run into the open hole section of the well bore. The screen assemblies are axially spaced along the length of the string. Each screen assembly has a filtration screen that encircles a base pipe. The base pipe has portion with one or more apertures that allow communication of fluids through the screen, and a portion not apertured (i.e., fluid impermeable) outside of the screen. An apertured shroud is positioned around the exterior of the filtration screen. Shunt tubes run axially through the screen assembly from one end to the other, and are radially between the apertured shroud and base pipe. The ends of the filtration screen are capped with annular end rings. The screen assemblies thread end to end, and jumper tubes connect between the end rings to connect the shunt tubes of one screen assembly to the next. Another shroud is positioned around the jumper tubes between the screen assemblies. With the production string in place, the annulus around the well screen assemblies is "gravel packed." In gravel packing, a particulate (e.g., gravel) laden slurry is pumped into the wellbore exterior the string. The particulate is deposited in the annulus around the screen assemblies, and the liquid in the slurry is pumped backed to the surface.

The joints of well screen assembly are transported to the well site individually (i.e., not coupled together) and are made-up into the production string joint by joint as the string is run into the well. Thus, the jumper tubes are installed on the drilling rig floor after the screen assembly joints are threaded together. A spring clip can be provided to hold the jumper tube to the end ring to maintain connection of the jumper tube and shunt tube. In certain instances, engaging the spring clips to hold the jumper tube does not require tools (e.g., a screw driver, a wrench, and/or other hand tool) or may only require use of a hammer to secure the jumper tubes. Additionally, everything is attached to either the jumper tube or the well screen assembly, so there are no small parts to complicate the assembly or be dropped into the well.

Figure 1:
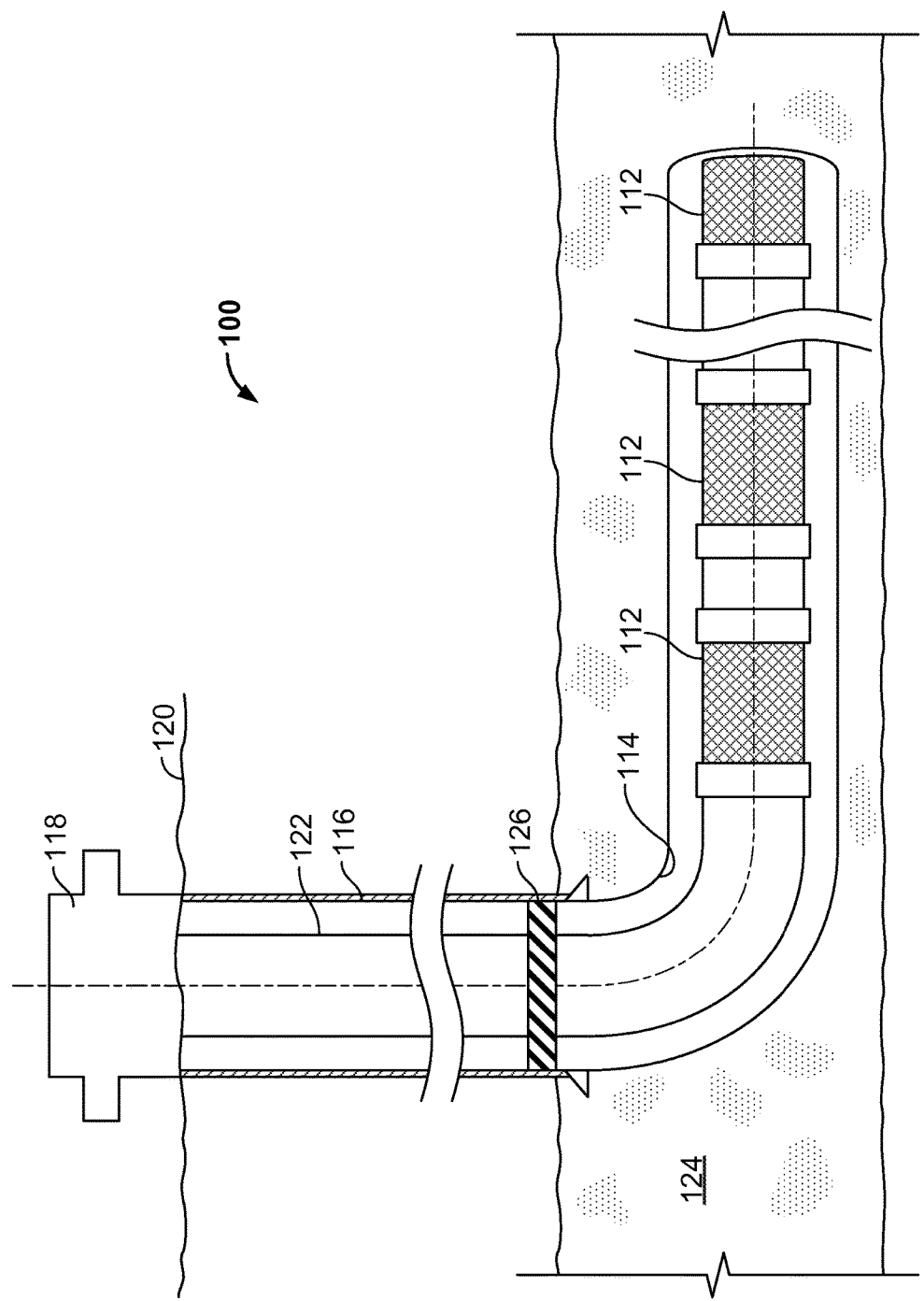
FIG. 1 is a schematic side view of a well system in accordance with the present disclosure.

FIG. 1 is a schematic side view of a well system 100 in accordance with the present disclosure. The well system 100 is shown as being a horizontal well, having a wellbore 114 that extends substantially vertically from a wellhead 18 at the surface, then deviates to horizontal or substantially horizontal in the subterranean zone of interest 124. A casing 116 is cemented in the vertical portion of the wellbore and coupled to the wellhead 118 at the surface 120. The remainder of the wellbore 114 is completed open hole (i.e., without casing). A production string 122 extends from wellhead 118, through the wellbore 114 and into the subterranean zone of interest 124.

A production packer 126 seals the annulus between the production string 122 and the casing 116. Additional packers 126 can be provided between the screen assemblies 112. The production string 122 operates in producing fluids (e.g., oil, gas, and/or other fluids) from the subterranean zone 124 to the surface 120. The production string 122 includes one or more well screen assemblies 112 (three shown). In some instances, the annulus between the production string 122 and the open hole portion of the wellbore 114 may be packed with gravel and/or sand. The well screen assemblies 112 and gravel/sand packing allow communication of fluids between the interior of the production string 122 and the subterranean zone 124. The gravel/sand packing provides a first stage of filtration against passage of particulate and larger fragments of the formation to the production string 122. The well screen assemblies 112 provide a second stage of filtration, and are configured to filter against passage of particulate of a specified size and larger into the production string 122.

Although shown in the context of a horizontal well system 100, the concepts herein can be applied to other well configurations, including vertical well systems having a vertical or substantial vertical wellbore, multi-lateral well systems having multiple wellbores deviating from a common wellbore and/or other well systems.

Figure 2:
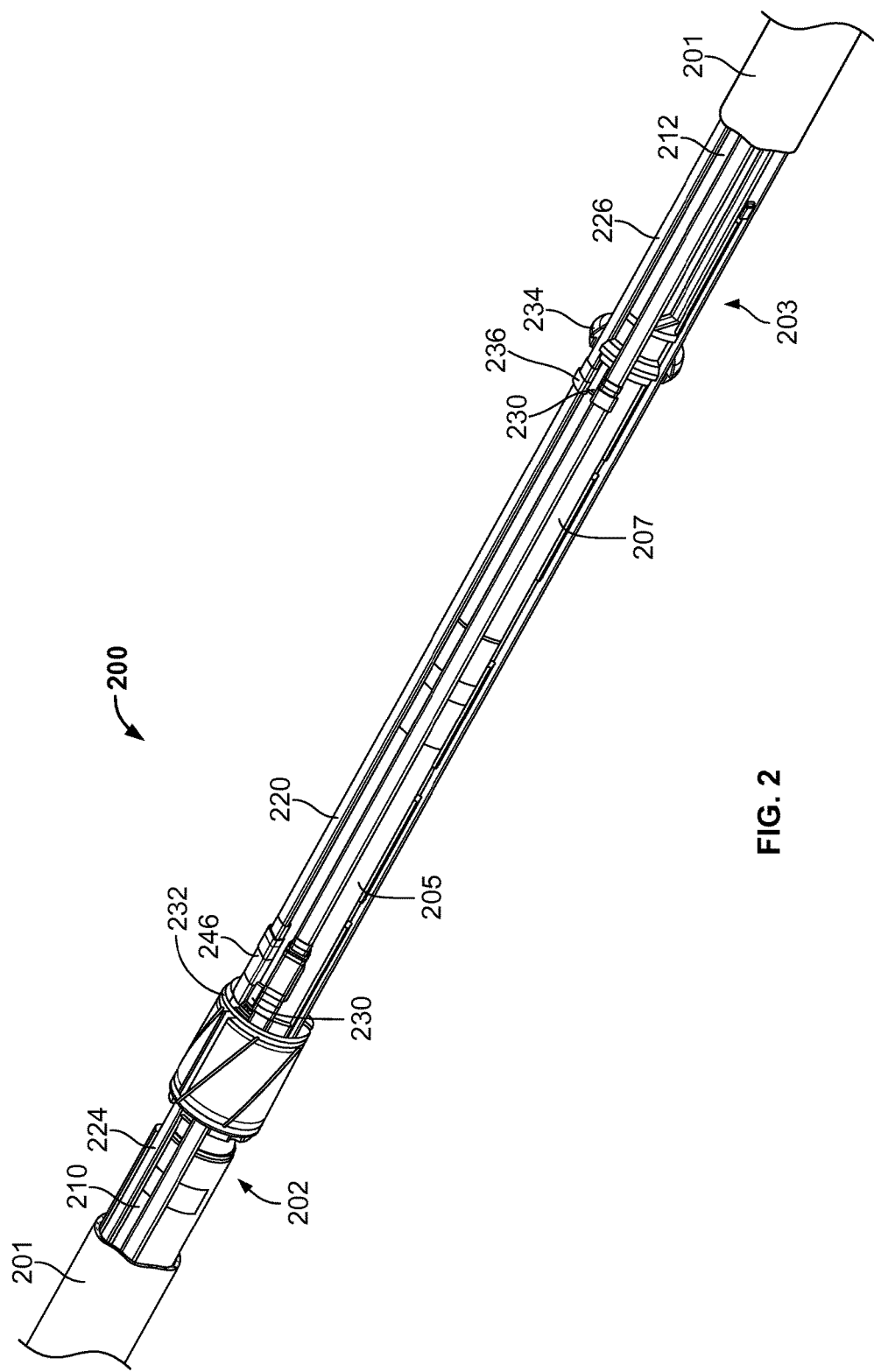
FIG. 2 is a perspective view of an example of a well screen system applicable to the well system of FIG. 1.

FIG. 2 illustrates an example manner of connecting two well screen assemblies of an example well screen system 200 that can be used in the well system of FIG. 1. For convenience of description, the well screen system 200 is illustrated with its inner components exposed (i.e., the outer shroud 201 is shown in partial break away). The well screen system 200 includes a first well screen assembly 202 and a second well screen assembly 203. The well screen assembly 202 includes a base pipe 205; and the well screen assembly 203 includes a base pipe 207. The base pipes 205, 207 are coupled end to end to each other (e.g., threadingly and/or otherwise). The well screen assembly 202 further includes a screen 210 around the base pipe 205. For example, the screen 210 can include one or more layers of sheet mesh or wire wrapped screen with a selected industry rating for filtering solid materials over a specified size. Similarly, the screen assembly 203 further includes a screen 212 similar to the screen 210.

An elongate shunt tube 224 is arranged axially along the base pipe 205 and terminated at an end ring 232 of the base pipe 205. The shunt tube 224 extends to another end ring (not shown) at the opposite end of the base pipe 205. The shunt tube 224 enables fluid to bypass during gravel packing operations. Similarly, the well screen assembly 203 includes an elongate shunt tube 226 that is arranged axially along the base pipe 207 and terminated at an end ring 234. The shunt tube 226 may be substantially similar to the shunt tube 224.

As illustrated in FIG. 2, each well screen assembly 202 or 203 includes one or more shunt tubes (two shown). The shunt tubes can be radially positioned between the screen 210 and the outer shroud assembly 201. In some implementations, the shunt tube 224 may be geometrically constrained to fit between the screen and the shroud, such that the cross section of the shunt tube 224 is not circular. In certain instances, the cross-section resembles a flat rounded rectangle. The shunt tubes 224, 226 are fluidically connected by an elongate jumper tube 220. The jumper tube 220 can have a substantially similar cross section as the shunt tubes 224, 226 (e.g., shown resembling a flat rounded rectangle). The shunt tubes 224 or 226 and the jumper tube 220 can be connected using coupling sleeves 236, 246. The coupling sleeves 236, 246 are shown in FIG. 2 as carried on the jumper tubes 220. In other instances, the sleeves 236, 246 could be carried on the shunt tubes 224, 226. The jumper tubes 220 and the shut tubes 224, 226 can include an outer profile for carrying seals to form a liquid and/or gas tight seal with the coupling sleeves 236, 246.

Figure 3:
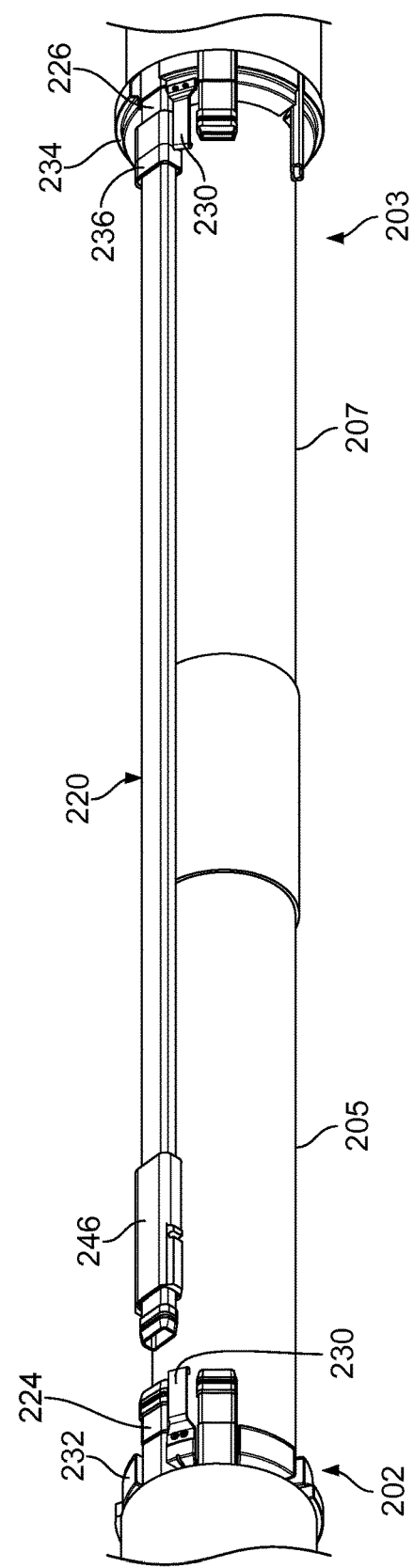
FIG. 3 is a detail side view of an example of installation of jumper tubes between the well screen assemblies of FIG. 2.

FIG. 3 illustrates an example of installation of the jumper tube 220 between well screen assemblies 202, 203. Each end of the jumper tube 220 may include a coupling sleeve 236 or 246. After the screen assemblies 202, 203 are coupled together, the jumper tube 220 can be installed by first sealingly coupling one end (e.g., the coupling sleeve 236) with an end portion of the shunt tube 226 first and then sealingly coupling the other end (e.g., the coupling sleeve 246) with an end portion of the shunt tube 224. The seal between the coupling sleeve 236 or 246 and the shunt tubes 224 or 226, as well as the jumper tube 220 may be created using metal to rubber, metal to metal, or other seals.

In the example, one coupling sleeve 236 may be affixed to the jumper tube 220; while the other coupling sleeve 246 can move along the longitudinal axis of the jumper tube 220. Thus, the jumper tube 220 is placed with the coupling sleeve 236 ready to be coupled with the shunt tube 224. The jumper tube 220 is then moved towards the shut tube 226, and the coupling sleeve 236 is forced into position over an interface between the jumper tube 220 and the shunt tube 226. The spring clip 230 is affixed to the end ring 232 and protrudes axially toward the other well screen assembly 203. The coupling sleeve 236 and spring clip 230 are configured such that the coupling sleeve 236 forces the spring clip 230 to flex outward over a profile protruding from the side of the coupling sleeve 236 when the jumper tube 220 and coupling sleeve 236 are moved into position. With the jumper tube 220 and coupling sleeve 236 in final position, the spring clip 230 snaps into gripping engagement of the profile of the coupling sleeve 246 to secure one end of the jumper tube 220 to the shunt tube 226.

Figure 4:
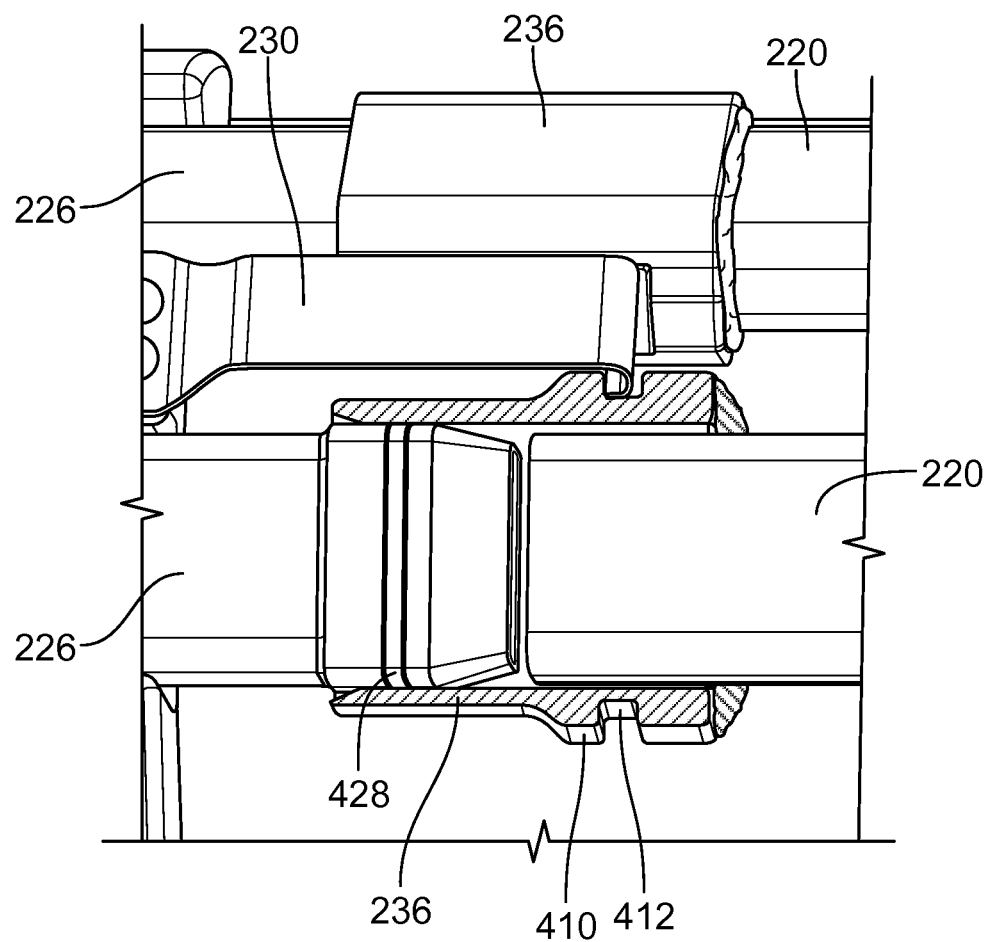
FIG. 4 is a detail side view of coupling sleeves being installed using spring clips in the well screen assemblies of FIG. 2.

The spring clip 230 may include a wedge-shaped leading end (i.e., on the end opposite the end ring). The wedge-shaped end can be a true triangle or have a curved or other similar shape that is configured to help force the spring clip 230 to flex outward over the profile when the coupling sleeve 236 or 246 is pushed in place. Detail of the wedge-shaped end and the gripping engagement are illustrated in FIG. 4, discussed below. If the coupling sleeve 236 is oriented downward (i.e., with the jumper tube 220 extending upward) the weight of the jumper tube 220 can be used to force the profile of the coupling sleeve 236 into the spring clip 230. There are no screws, bolts, nuts or any other small items that are needed to make up the connection; therefore no hand tools are needed. Additionally, everything is attached to either the jumper tube 220 or the well screen assembly, so there are no small parts to complicate the assembly or potentially be dropped into the well.

After the coupling sleeve 236 is in place, the other end of the jumper tube (e.g., the coupling sleeve 246) is aligned with the shunt tube 226. The coupling sleeve 246 is then telescopically extended over the shunt tube 224 into a coupling position, with its profile flexing the spring clip 230 outward as it moves. The spring clip 230 is affixed to the end ring 234 and protrudes axially toward the other well screen assembly 202. The spring clip 230 snaps into gripping engagement of the profile on the coupling sleeve 246 as the coupling sleeve 246 is extended into final position to secure the jumper tube 220 to the shunt tube 224. The force for telescopically extending the coupling sleeve 246 can be applied by the operator manually grasping the sleeve 246 with his hands and pushing the sleeve 246 into place. If additional force is required, a hammer may be used. However, as above, there are no screws, bolts, nuts or any other small items that are needed to make up the connection; therefore no hand tools are needed. Additionally, everything is attached to either the jumper tube 220 or the well screen assembly, so there are no small parts to complicate the assembly or potentially be dropped into the well.

Notably, although discussed as being different configurations of coupling sleeves 236, 246, in some implementations, the coupling sleeve 236 may be identical to the coupling sleeve 246. Also, the order of installation of the coupling sleeves 236, 246 described above may be altered based on the specific embodiment of the coupling sleeve.

FIG. 4 shows coupling sleeves 236 at the installed position grippingly engaged by the spring clip 230. One of the coupling sleeves 236 is shown in half cross-section. As illustrated in the cross-sectioned coupling sleeve 236, a protrusion 410 and a groove 412 define a profile on the side of the coupling sleeve 236 that is gripped by the spring clip 230. The coupling sleeve 246 can have a similar profile. The groove 412 allows the spring clip 230 to apply locking force in the direction along the longitudinal axis of the jumper tube. For example, the spring clip 230 has a curved end that enters the groove 412 and rests on the sidewall of the groove 412. The curved end holds the coupling sleeve 236 towards the shunt tube 226. Resultantly, the spring clip 230 can perform substantially all retaining of the jumper tubes 220 during operation of the well screen system downhole. The end of the shunt tube 226 may include seal 428 that can seal with the coupling sleeve 426. Various embodiments of the spring clip 230 may be implemented. Two specific examples are further illustrated in FIGS. 5A and 5B.

FIGS. 5A and 5B illustrate examples of spring clips 500 and 550 for connecting jumper tubes that can be used as spring clip 230. Each spring clip 500, 550 includes a mounting flange 505 that allows the spring clip 500, 550 to be affixed to the end ring or other structure of the well screen assembly. Each spring clip includes an engagement portion 520 that allows the spring clip 500, 550 to snap into and grippingly engage a profile of a coupling sleeve, providing locking forces along the longitudinal axis of a jumper tube. In FIG. 5B, the spring clip 550 has a substantially flat portion 560 between the flange 505 and engagement portion 520. In FIG. 5A, the spring clip 500 has an angled portion 510 between the flange 505 and the engagement portion 520. In certain instances, the spring clips 500, 550 are made from bent metal, e.g., spring steel or another metal. Although two specific examples of spring clips are illustrated in FIGS. 5A and 5B, other implementations self-locking/securing mechanism are possible.

A number of embodiments have been described. Nevertheless, it will be understood that various modifications may be made. Accordingly, other embodiments are within the scope of the following claims.

What is claimed is:

1. A well screen system, comprising:
a first well screen assembly comprising a first base pipe, a first screen around the first base pipe and a first shunt tube arranged axially along the base pipe;
a second well screen assembly comprising a second base pipe adapted to couple to the first base pipe, a second screen around the second base pipe and a second shunt tube arranged axially along the base pipe;
a jumper tube adapted to couple the first and second shunt tubes; and a spring clip adapted to move radially towards the first base pipe to grippingly engage a side member of the jumper tube to couple the first well screen assembly to the jumper tube.

2. The well screen system of claim 1, where the jumper tube comprises a coupling sleeve telescopically carried on an elongate tubing; and
where the spring clip snaps into gripping engagement of the coupling sleeve when the coupling sleeve is telescopically extended into position over an interface between the elongate tubing of the jumper tube and the first shunt tube.

3. The well screen system of claim 2, where the spring clip is affixed to the first well screen assembly.

4. The well screen system of claim 2, where the spring clip grips a protrusion of the coupling sleeve.

5. The well screen system of claim 4, where the spring clip comprises a wedge-shaped end opposite the first screen assembly, the wedge-shaped end is positioned to force the spring clip to flex radially over the protrusion when the coupling sleeve is telescopically extended into the spring clip.

6. The well screen system of claim 2, where the spring clip snaps into gripping engagement of the coupling sleeve by forcing the coupling sleeve into the spring clip.

7. The well screen system of claim 2, where the jumper tube comprises a second coupling sleeve telescopically carried on the elongate tubing, the second coupling sleeve being axially shorter than the first mentioned coupling sleeve; and
comprising a second spring clip affixed relative to the second well screen assembly that snaps into gripping engagement of the second coupling sleeve when the second coupling sleeve is telescopically extended into position over an interface between the elongate tubing of the jumper tube and the second shunt tube.

8. The well screen system of claim 1, where the first well screen assembly comprises an end ring and where the spring clip is affixed to the end ring and protrudes axially toward the second well screen assembly.

9. The well screen system of claim 1, where the spring clip can be set into engaging the jumper tube to the first well screen assembly without using hand tools.

10. The well screen system of claim 9, where the spring clip is flexed radially and then snaps into gripping engagement of the jumper tube as the jumper tube is positioned adjacent the first shunt tube.

11. The well screen system of claim 1, where the spring clip performs substantially all retaining of the jumper tube to the first shunt tube during operation of the well screen system downhole.

12. A method of coupling a jumper tube to a shunt tube of a well screen assembly, comprising:
positioning the jumper tube end to end, adjacent with the shunt tube; and flexing a spring clip radially away from a base pipe of the well screen assembly to allow it to position over a profile of a coupling and allowing it to snap radially towards the base pipe and into gripping engagement with a side member of the coupling, thereby retaining the jumper tube relative to the screen assembly, where the jumper tube includes the coupling.

13. The method of claim 12, wherein the method comprises telescopically extending the coupling of the jumper tube into position over an interface between the jumper tube and shunt tube, and grippingly engaging the coupling with the spring clip.

14. The method of claim 13, comprising extending the coupling by hand.

15. The method of claim 12, where flexing the spring clip and allowing it to snap into gripping engagement of the coupling is performed without hand tools.

16. The method of claim 12, comprising retaining the jumper tube to the shunt tube substantially entirely with the spring clip during operation of the well screen assembly downhole.

* * * * *